United States Patent
Wittmann et al.

(10) Patent No.: US 7,000,756 B2
(45) Date of Patent: Feb. 21, 2006

(54) CONVEYOR

(75) Inventors: Walter Wittmann, Schierling (DE);
Andreas Brunner, Aufhausen (DE);
Klaus Pöllinger, Nittenau (DE)

(73) Assignee: Krones AG, Neutraubling (DE)

( * ) Notice: Subject to any disclaimer, the term of this patent is extended or adjusted under 35 U.S.C. 154(b) by 9 days.

(21) Appl. No.: 10/477,730

(22) PCT Filed: Jan. 25, 2003

(86) PCT No.: PCT/EP03/00762

§ 371 (c)(1),
(2), (4) Date: Aug. 23, 2004

(87) PCT Pub. No.: WO03/068643

PCT Pub. Date: Aug. 21, 2003

(65) Prior Publication Data

US 2005/0011730 A1   Jan. 20, 2005

(30) Foreign Application Priority Data

Feb. 12, 2002 (DE) ................................ 102 06 634

(51) Int. Cl.
*B65G 37/00* (2006.01)

(52) U.S. Cl. .................. 198/470.1; 198/803.7

(58) Field of Classification Search ............. 198/470.1,
198/474.1, 478.1, 476.1, 477.1, 803.7, 867.05
See application file for complete search history.

(56) References Cited

U.S. PATENT DOCUMENTS

| 3,175,702 | A |   | 3/1965  | Banyas       |          |
|-----------|---|---|---------|--------------|----------|
| 3,938,847 | A | * | 2/1976  | Peyton       | 198/470.1 |
| 3,987,605 | A |   | 10/1976 | Johnson      |          |
| 4,023,513 | A |   | 5/1977  | Dean         |          |
| 4,172,514 | A | * | 10/1979 | Shantz et al.| 198/470.1 |
| 5,711,411 | A | * | 1/1998  | Zurweller    | 198/470.1 |
| 5,743,377 | A | * | 4/1998  | Kronseder    | 198/803.9 |
| 6,371,279 | B1| * | 4/2002  | Le           | 198/478.1 |
| 6,691,860 | B1| * | 2/2004  | Osterfeld et al. | 198/468.2 |

FOREIGN PATENT DOCUMENTS

IT    1296413    11/1997

* cited by examiner

*Primary Examiner*—James R. Bidwell
(74) *Attorney, Agent, or Firm*—Marshall, Gerstein & Borun LLP

(57) ABSTRACT

A conveyance device, particularly relating to a shaking pocket star wheel for conveying containers, with a carrier, a reception element and a reception opening for the conveyed material. The reception element is fixed against the force of a spring in a manner so it can be withdrawn and swiveled about an axis of rotation. To simplify the construction of the conveyance device, and to make the design more universal and operationally reliable, a spring is arranged in such a manner that the force is applied substantially at a right angle to the conveyance direction.

20 Claims, 3 Drawing Sheets

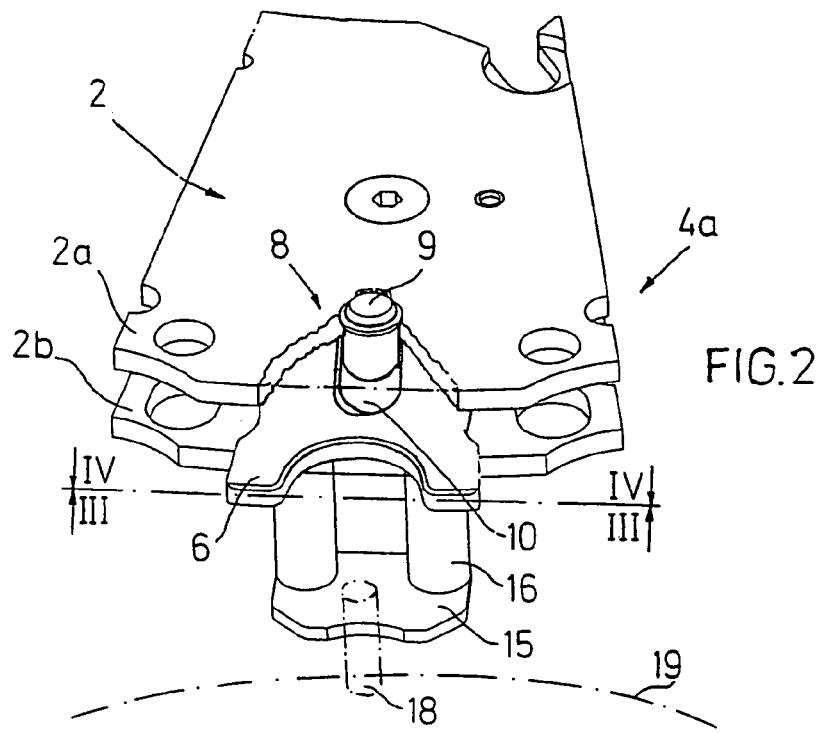
FIG. 2
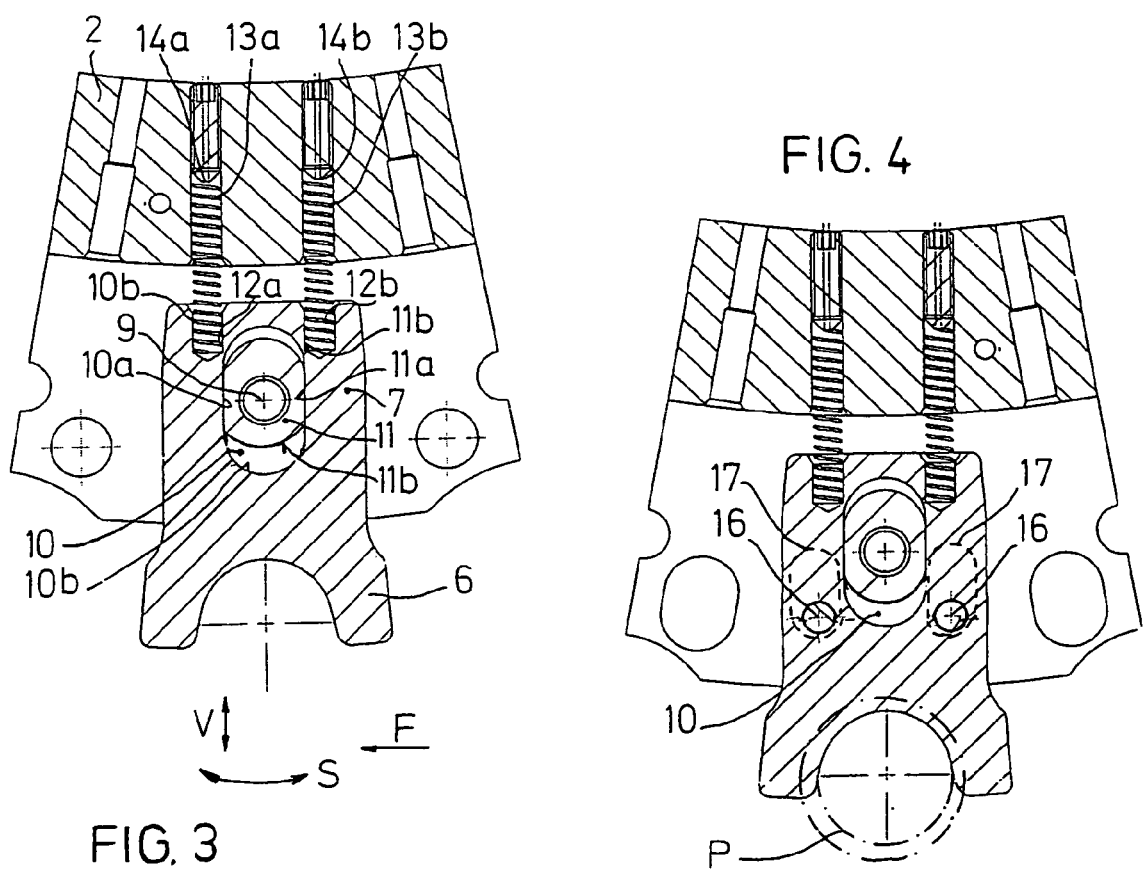
FIG. 3
FIG. 4

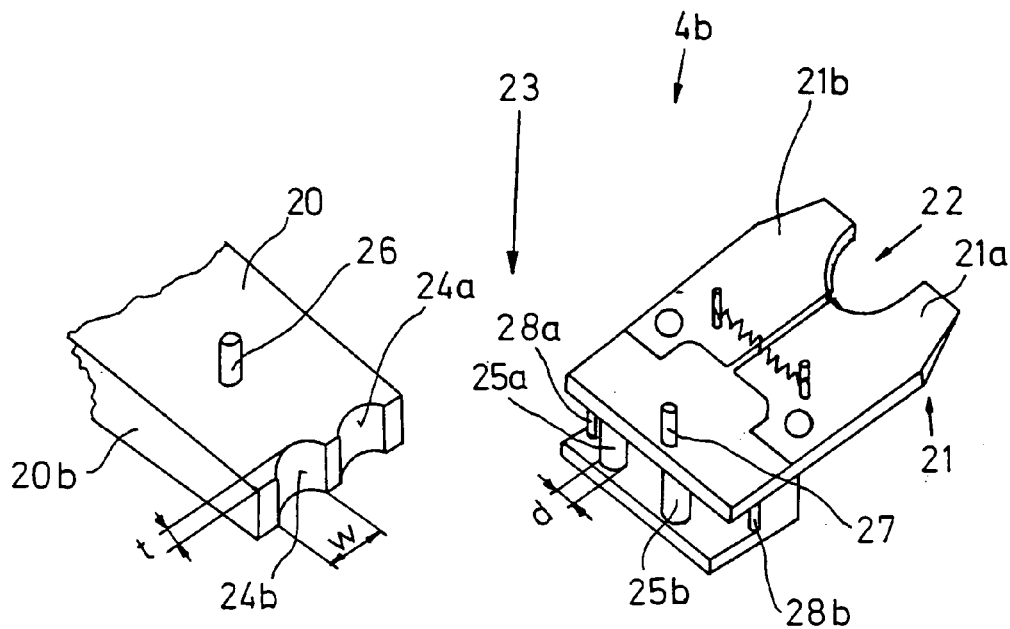
FIG. 5
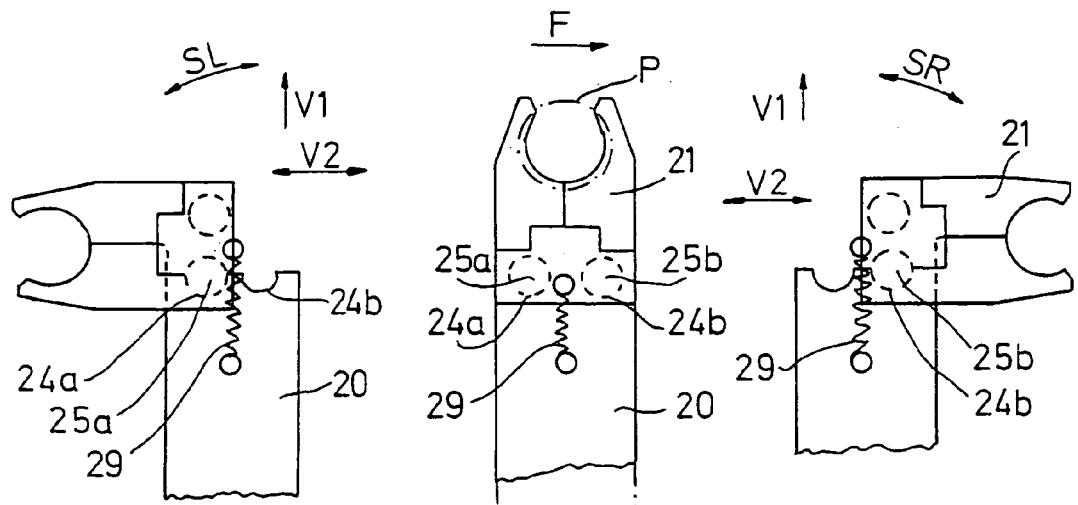
FIG. 7     FIG. 6     FIG. 8
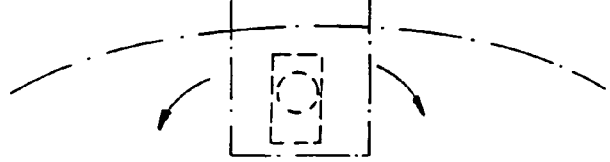

CONVEYOR

FIELD OF THE INVENTION

The invention relates to a conveyance device of the type used in a star wheel for conveying containers and preforms.

BACKGROUND OF THE INVENTION

Such a conveyance device is known from U.S. Pat. No. 3,175,702. The known conveyance device is designed as a so-called shaking pocket star wheel, that is it contains a conveyance carrier which runs in a circle about an axis, on whose circumference a multitude of reception elements are arranged, which present a reception opening which opens outward, into which one can insert the goods to be conveyed, preferably bottle like containers, with their neck in such a manner that the reception elements grabs under a flange or similar part on the container and thus suspends the container on the reception element. At another place of the circumference of the carrier, the container is usually transferred to an additional device, in which it is simply pulled out of the reception openings of the reception element, where the openings open outward. The transfer of the container on such a star conveyor and the removal of the container from these star conveyors is preferably carried out automatically. However, since one can never rule out that the loading and unloading devices do not work absolutely synchronously with the star conveyor, the reception elements are located in a manner so they can withdraw, in this type of conveyor. The reception element of the known conveyor device is therefore attached in a manner so it can swivel about an axis of rotation. Centering fingers are arranged on both sides of the axis of rotation, and they are attached to the carrier in a manner so they can be swiveled and they are pulled by a spring in a direction toward each other and with application against the axis of rotation. On the reception element, two actuation pins are provided, which are applied at a distance from the axis of rotation against the centering fingers. If the reception element is now swiveled about the axis of rotation, then the pin which precedes the swiveling motion is lifted against the force of the spring of a centering finger from the axis of rotation, resulting in an increase in the distance from the other centering finger. If the force which causes the reception element to withdraw is eliminated, then the spring pulls back the centering finger which has been uncoupled, and the centering finger again moves the reception element along. In the known conveyance device, the spring acts approximately parallel to the conveyance direction. Because these types of conveyance devices run very rapidly, the centrifugal forces applied to the spring can lead to functional problems. Furthermore, using this type of arrangement of the spring, it is only possible to apply loads to swiveling motions about an axis of rotation. In addition, the known conveyance device has a relatively complicated design, and is therefore expensive and subject to breakdown.

Furthermore, from IT 1 296 413, a conveyance device is known in which the reception elements are connected with the carrier by an elastic connection piece made of plastic, which can be bent to all sides. This design is subject to a large amount of wear, and the middle position of the reception element is not sufficiently stable.

SUMMARY OF THE INVENTION

The invention is based on the problem of producing a conveyance device which has an attachment of the reception elements, which attachment has a simple design, can be used universally and is operationally reliable.

In the design according to the invention, a spring for applying load to the swiveling withdrawal motion is used, which spring is substantially perpendicular to the conveyance direction. This spring works reliably and it cannot be laterally uncoupled if a centrifugal force develops. The neutral position of the reception elements is exceedingly stable.

One advantageous variant is to use a single spring to load both a withdrawal-swivel motion and also a withdrawal shift.

BRIEF DESCRIPTION OF THE DRAWINGS

Embodiment examples of the invention are further explained below with reference to the drawing. In the drawing:

FIG. 2 shows a detail enlargement in the area A of FIG. 1 of a first embodiment example, FIG. 3 shows the view III—III from FIG. 2, FIG. 4 shows the view IV—IV from FIG. 2, FIG. 5 shows a detail of an additional embodiment example of the conveyance device according to the invention, in perspective view, FIG. 6 shows an embodiment example according to FIG. 5 in neutral position, FIG. 7 shows the embodiment example according to FIG. 5 swung out in one direction, FIG. 8 shows the embodiment example according to FIG. 5, swung out in the other direction.

DETAILED DESCRIPTION OF THE DRAWINGS

Figure 1:
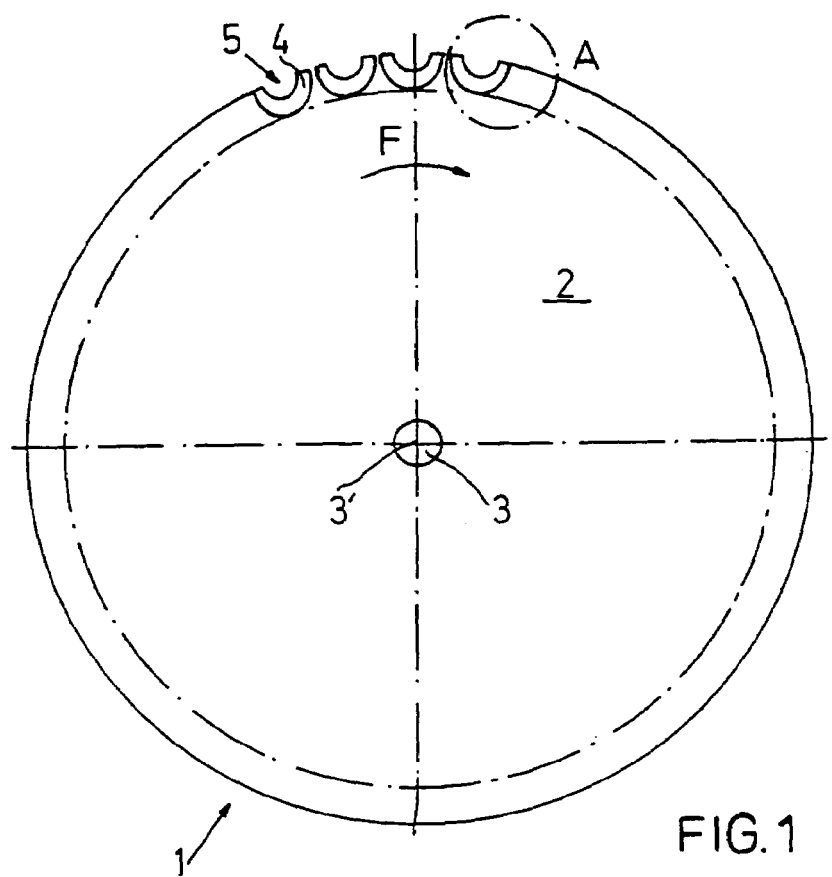
FIG. 1 shows a top view of a conveyance device constructed according to the invention, in a schematic representation.

FIG. 1 shows a conveyance device 1 which is designed as a star conveyor, as used, for example, in automatically operating conveyance installations for conveying plastic bottles or similar containers, or corresponding performs, and in extension blow molding machines. However, the invention is not limited to conveyance devices which run in a circle, rather, for example, it can also be used for endless chain conveyors or similar devices. The conveyance device 1 contains a carrier 2 which is driven in rotation by a shaft 3, in a known manner, about an axis of rotation 3' which is vertical with respect to FIG. 1, in the direction of the arrow F, that is the conveyance direction. On the circumference of the carrier 2, a multitude of reception elements 4 are arranged, with reception openings 5 which open radially outward. In FIG. 1, these reception elements 4 are shown with only a part of the circumference; however, the entire circumference is naturally occupied with these reception elements 4. For example, the reception elements 4 can be fitted with controllable gripping fingers which enclose the reception opening 5, or they can present gripping jaws which can be moved elastically with respect to each other, as is sufficiently known in the state of the art, so that this special construction does not need to be explained again.

FIG. 2 shows a first embodiment example of a reception element 4a for a conveyance device 1 which is equipped according to the invention. The reception element 4a presents rigidly interconnected fingers 6 in a fork shaped arrangement, which fingers are attached via a pivot shift bearing 8, with one end pointing backward, that is in the direction of the rotation shaft 3, above a mounting part 7, between a top plate 2a and a bottom plate 2b of the carrier 2. The pivot shift bearing 8 presents a pin shaped axis of rotation 9, which is applied against the top and the bottom plate 2a, 2b. The axis of rotation 9 extends through an opening 10, shaped in the form of a longitudinal hole, in the mounting plate 7. The dimensions of the opening 10 are greater in every direction than the diameter of the axis of rotation 9. Between the axis of rotation and the assembly plate 7, in the opening 10, a guide piece 11 is arranged which can be rotated about the axis of rotation. The guide piece 11 presents, on both sides and at a distance from the axis of rotation 9, two sliding surfaces 11a, which are substantially perpendicular to the conveyance direction F and which are applied in a sliding manner to correspondingly shaped side surfaces 10a of the opening 10. Perpendicularly to the conveyance direction F, the conveyance piece 11 is shorter than the opening 10, so that the mounting part 7 with the forked fingers 6 can be shifted in the direction of the double arrow V until the corresponding front side 11b of the guide piece 11 abuts against the associated front side 10b of the opening 10.

Blind hole like points of attack 12a and 12b of two screw springs 13a and 13b, designed as pressure springs, are located at the end of the mounting part 7 of the reception element 4a, which end is directed toward the rotation shaft 3, where the other ends of the screw springs are applied at blind hole like points of attacks 14a and 14b against the carrier 2. The springs 13a, 13b extend substantially at a right angle with respect to the conveyance direction F and parallel to each other. The expression "substantially at a right angle with respect to the conveyance direction" means that the curvature of the conveyance direction of the conveyance device according to FIG. 1 is negligible, so that this expression does not exclusively include strictly radial directions. The points of attacks 12a, 12b are located at a distance along the conveyance direction F on both sides of the axis of rotation 9, so that the reception element 4a is loaded symmetrically with respect to the axis of rotation 9 and a lever effect is generated with respect to the axis of rotation 9.

The reception element 4a is also provided with an entrainment plate 15. The entrainment plate 15 is connected via spacer pins 16 with the fingers 6, where the spacer pins 16 extend through longitudinal hole like openings 17 (FIG. 4) in the bottom plate 2b of the carrier 2, whose dimensions are greater than the dimensions of the separation pin 16, namely in such a manner that both openings 17 serve as abutment, in particular for a swiveling motion S about the axis of rotation 9.

The reception element 4a can thus swivel along the double arrow S together with the guide piece 11 about the axis of rotation 9 and against the spring force of the springs 13a, 13b, to the extent allowed by the spacer pins 16 running in the openings 17. In the represented embodiment example, the swivel motion out of the rest position shown in FIGS. 2–4 is carried out symmetrically on both sides with respect to the axis of rotation 9, that is both in the conveyance direction F and also opposite to the conveyance direction F. The reception element 4a, furthermore, can again be shifted against the force of the springs 13a, 13b, in the direction of the double arrow V with respect to the axis of rotation 9 and toward the guide piece 11, substantially perpendicularly to the conveyance direction F.

The normal position of the reception element 4a is defined in a stable manner during operation by an advantageous cooperation of the springs 13a, 13b and the abutments 10b, 11b, or 16, 17, and it is represented in FIGS. 2–4. If a force is applied to the reception element force of the springs 13a, 13b, then a withdrawal motion of the reception element 4a is possible, where, in practice, the pure basic motions V and S are rarely performed, rather the withdrawal movement is determined by an appropriate combination of these basic movements V and S.

The withdrawal motion can be triggered, for example, directly by a preform P, if the latter is pressed by a preceding transport device 19 into the area between the fingers 6 of a reception element 4. However, the withdrawal motion can also be actively controlled, namely by control bolts 18 which engage with the entrainment plates 15, which are attached to the preceding transport device 19 The latter can be, for example, a heated wheel for the preforms P, to which preforms are fixed which engage in the opening. In this context, it is advantageous for the circular track of the rigid control bolts 18 to slightly penetrate into the theoretical circular track of the elastically withdrawing entrainment plates 15, so that the movement track of the latter is briefly adapted to the circular path of the control bolts 18. As a result, the transfer of the preforms from the transport device 19 to the conveyance device 1 is decisively improved, and sufficient time is allowed to remove the preforms from the opening of the preforms P.

FIGS. 5–8 show a second embodiment example of a reception element 4b, which can be used in the same manner as the reception element 4a in the conveyance device 1 shown in FIG. 1.

The reception element 4b contains a mounting plate 20 which is rigidly attached or attached in a manner which allows control by movement, on a carrier which is not represented, for example, the carrier 2 of the conveyance device 1. The reception element 4b, furthermore, contains a gripping part 21 which, in the present embodiment example, contains gripping jaws 21a and 21b which can be moved relative to each other, and which enclose a reception opening 22. The two gripping jaws 21a, 21b can be moved in the conventional manner, not shown, for opening and closing the reception opening 22 about a corresponding neck portion of a container.

The mounting plate 20 and the gripping part 21 are interconnected via a pivot shift bearing 23. The pivot shift bearing 23 contains substantially semi-cylindrical seat recesses 24a, 24b, which are machined into the front side of the mounting plate 20, which is directed outward and runs substantially parallel to the axis of rotation 3' of the carrier 2. Moreover, the pivot shift bearing 23 contains two hinge pins 25a, 25b which are provided on the front side of the gripping part 21, which is directed toward the mounting plate 20. The mounting pins 25a, 25b have a diameter d, which is slightly smaller than the opening width w of the seat recesses 24a, 24b. The seat recesses 24a, 24b have a depth t which is smaller than or equal to the half diameter d of the hinge pins 25a, 25b.

Both hinge pins 25a, 25b are arranged with the same separation of their center lines, like the seat recesses 24a, 24b. In this manner, the hinge pins 25a, 25b are received with some clearance, parallel to the conveyance direction F, where the clearance increases in the radial direction outward, that is perpendicularly to the conveyance direction F.

Symmetrically between the seat recesses 24a and 24b, on a mounting plate 20, an attachment pin 26 is arranged, and, in the middle between the hinge pins 25a, 25b, on the gripping part 21, an additional attachment pin 27 is arranged, where the attachment pins 26 and 27 are located on a common connection line at a right angle with respect to the conveyance direction F, and form the coupling points of the screw springs 29, which are designed as bolt springs, and represented in FIGS. 7–8. The attachment pin 26 is located in the middle between the two seat recesses 24a, 24b, as well as radially inward and at a distance from the latter. The pin 27 is located in the middle between the two hinge pins 25a, 25b and on the side of the connection of the middle lines of the two hinge pins 25a, 25b, which side is turned toward the seat recesses 24, so that the springs 29 develop a lever action by means of their portion of the separation from the hinge pins 25, which portion runs parallel to the conveyance direction F.

On both sides of the storage pins 25a, 25b, on the external sides of the gripping part 21, abutment surfaces 28a, 28b are provided, which work in cooperation with the corresponding abutting side surface 20b of the mounting plate 20.

As a result of the force of the spring 29, both hinge pins 25a, 25b are pulled symmetrically into the corresponding abutting seat recess 24a, 24b in the normal position, shown in FIG. 6, of the reception element 4b.

If a force is applied to the gripping part 21, which exceeds the force of the spring 29, then the gripping part 9, depending on the direction of the force application, is swiveled out of the normal position, as represented in FIGS. 7 and 8. As a result, the gripping part 21, as shown in FIG. 7, can be swiveled out in the direction of the double arrow $S_L$ to the left, that is against the conveyance direction F, where the gripping part 21 is swiveled about the pin 25a located in the seat recess 24a until the abutment 28a abuts against the applied side wall 20b of the mounting plate 20, and the hinge pin 25b exits from its seat recess 24b. Moreover, a shift $V_1$ outward and substantially perpendicular to the conveyance direction F as well as a shift $V_2$ approximately parallel to the conveyance direction are also possible. All the movements occur against the force of the spring 29. Accordingly, the spring 29 will seek to pull back the gripping part into the normal position according to FIG. 6, as soon as the uncoupling force ceases. In the same manner, the gripping part 21, as shown in FIG. 8, can be swiveled to the right about the hinge pin 25b located in the seat recess 24b, until the abutment 28b abuts against the associated side surface 20b.

The above described conveyance direction according to FIGS. 5–8 is particularly well suited, for example, for the insertion of heated preforms P in open blow molds of extension blow molding machines. If the preform is not received properly by the blow mold, for any reason whatsoever, the pivot shift bearing 23 allows an immediate withdrawing of the concerned gripping part 21 with the preform. Damages to the expensive blow molds as well as to the conveyance device itself are thus reliably prevented, and there is no need for an emergency stoppage of the extension blow molding machine. In the above described application case, it is advantageous to position the mounting plates 20 with the gripping parts 21 in such a manner that they can be both swiveled and also shifted on the carrier 2, by means of conventional cam controls which are not shown. This is indicated in broken lines in FIG. 6.

Figure 9:
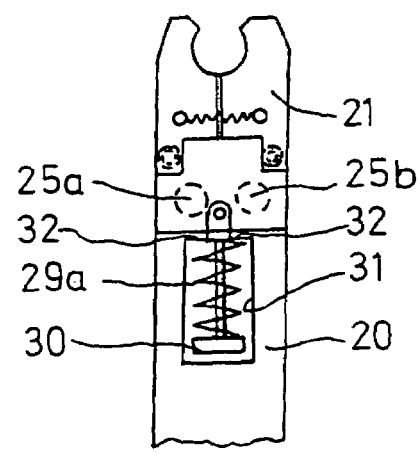
FIG. 9 shows a detail of an additional embodiment example.

The embodiment example according to FIG. 9 differs from the embodiment example according to FIGS. 5–8 only in the design of the spring element. The latter is here designed as a pressure spring 29a and inserted on an adjustable bolt 30. The latter is coupled in the middle between the hinge pins 25a, b to the gripping part 21, in such a manner that it can be moved, and it extends in a radial recess 31 in the mounting plate 20. The pressure spring 29a is braced, on the one hand, on the adjustable bolt 30 and, on the other hand, on abutments 32 on the radially external end of the recess 31. Consequently, the effect is substantially the same as that of the bolt spring 29 in the embodiment example according to FIGS. 5–8. However, the pressure spring 29a is protected better and the operational reliability is improved.

As a deviation from the described and represented embodiment examples, the reception elements constructed according to the invention can also be used in linear conveyors. The embodiment example according to FIGS. 2–4 can also be carried out using only one spring, and the embodiment example according to FIGS. 5–8 can also be carried out using only one seat recess, particularly if only one swivel possibility out of the normal position in only one direction is required, that is either in the conveyance direction or opposite to the conveyance direction. In the embodiment example according to FIGS. 5–8, the seat recess can be precisely adapted to the dimension of the hinge pin, so that, at least in proximity to the normal position, only a shift which is substantially perpendicular to the conveyance direction is possible. Instead of the screw springs represented, one can also use springs of a different construction. In the embodiment example according to FIGS. 2–4, the guide piece 11 with the longitudinal hole 10 can also be omitted, or it can be designed without abutment effect. The restriction of movement in that case is achieved only by means of the spacer pins 16 working in cooperation with the longitudinal holes 17.

What is claimed is:

1. Conveyance device such as for use with a star wheel for conveying containers or preforms along a conveyance direction, comprising a carrier, at least one reception element which is provided with a reception opening for conveyed material, the at least one reception element fixed against the force of a spring in a manner so it can be withdrawn and swiveled about an axis of rotation relative to the carrier, and the force of the spring (13, 29) being substantially applied at a right angle with respect to the conveyance direction (F).

2. Conveyance device according to claim 1, wherein the spring (13, 29) is applied between a point of attack (12, 27) on the reception element (4a, 4b) and a point of attack (14, 26) on the carrier (2).

3. Conveyance device according to claim 2, wherein the point of attack (12, 27) of the spring (13, 29) on the reception element (4a, 4b), in the conveyance direction (F), presents a separation from the axis of rotation (9, 25a, 25b).

4. Conveyance device according to claim 1, and a stop (16, 17, 28a, 28b) for the swivel motion (S) is provided.

5. Conveyance device such as for use with a star wheel for conveying containers or preforms along a conveyance direction, comprising a carrier, at least one reception element which is provided with a reception opening for conveyed material, the at least one reception element fixed against the force of a spring in a manner so it can be withdrawn and swiveled about an axis of rotation, and the force of the spring (13, 29) being substantially applied at a right angle with respect to the conveyance direction (F), and a bearing provided as a pivot shift bearing (8, 23), whereby the reception element (4a, 4b) can be both swiveled and also shifted against the force of the spring (13, 29).

6. Conveyance device according claim 1, wherein the axis of rotation (9, 25a, 25b) is received in an opening (10, 24a, 24b) whose dimension is larger than the diameter of the axis of rotation (9, 25a, 25b).

7. Conveyance device such as for use with a star wheel for conveying containers or preforms along a conveyance direction, comprising a carrier, at least one reception element which is provided with a reception opening for conveyed material, the at least one reception element fixed against the force of a spring in a manner so it can be withdrawn and swiveled about an axis of rotation, and the force of the spring (13, 29) being substantially applied at a right angle with respect to the conveyance direction (F), wherein the axis of rotation (9, 25a, 25b) is received in an opening (10, 24a, 24b) of a size larger than the diameter of the axis of rotation (9, 25a, 25b), wherein the opening (10) is a longitudinal hole.

8. Conveyance device according to claim 6, wherein a guide piece (11) is arranged between the opening (10) and the axis of rotation (9).

9. Conveyance device according to claim 8, wherein the guide piece (11) can be swiveled about the axis of rotation (9) and is one of applied with two opposite sliding surfaces (11a) on associated counter surfaces (10a) in the opening (10) and provided with two abutments (11b, 10b) to limit the shift (V).

10. Conveyance device according to claim 6, wherein the axis of rotation (9) is fixed on the carrier (2) and the opening (10) is provided in the reception element (4a).

11. Conveyance device according to claim 1, wherein for swiveling the reception element (4a), both in the conveyance direction (F) and also in the opposite conveyance direction (F), two springs (13a, 13b) are provided, which engage, with separation in the conveyance direction (F), on both sides of the axis of rotation (9) with the reception element (4a).

12. Conveyance device according to claim 1, wherein the spring (13) is a pressure spring.

13. Conveyance device according to claim 5, wherein the bearing (23) presents two axes of rotations (25a, 25b) which are separated in the conveyance direction (F) and two open seat recesses (24a, 24b) for the axes of rotations (25a, 25b).

14. Conveyance device according to claim 13, wherein the spring (29) engages between, and at a distance from, the axes of rotations (25a, 25b).

15. Conveyance device according to claim 13 wherein the spring (29) is a bolt spring.

16. Conveyance device according to claim 13, wherein the axes of rotations (25a, 25b) are received with clearance in the seat recesses (24a, 24b).

17. Conveyance device according to claim 13, wherein the seat recesses (24a, 24b) have a shape which is approximately semicircular and the axes of rotations (25a, 25b) present an approximately round cross section.

18. Conveyance device according to claim 13, wherein the seat recesses (24a, 24b) are connected with a carrier (2).

19. Conveyance device according to claim 13, wherein the seat recesses (24a, 24b) are arranged on a mounting plate (20) which is arranged on the carrier (2) in a manner so it can be moved.

20. Conveyance device according to claim 13, wherein the spring (29) presses the axis of rotation (25a, 25b) elastically against the seat recesses (24a, 24b).

* * * * *

UNITED STATES PATENT AND TRADEMARK OFFICE
CERTIFICATE OF CORRECTION

PATENT NO. : 7,000,756 B2 Page 1 of 1
APPLICATION NO. : 10/477730
DATED : February 21, 2006
INVENTOR(S) : Walter Wittmann et al.

It is certified that error appears in the above-identified patent and that said Letters Patent is hereby corrected as shown below:

On the Title Page:

At the title, Item (54), "Conveyor" should be -- Conveyance Device --,

At line (30), "102 06 634" should be -- 102 06 634.5 --.

At Column 1, line 1, "Conveyor" should be -- Conveyance Device --.

Signed and Sealed this

Ninth Day of January, 2007

JON W. DUDAS
*Director of the United States Patent and Trademark Office*